US008713157B2

(12) United States Patent
Dowling et al.

(10) Patent No.: US 8,713,157 B2
(45) Date of Patent: Apr. 29, 2014

(54) SYSTEM FOR COLLECTING COMPUTER APPLICATION USAGE DATA OF TARGETED APPLICATION PROGRAMS EXECUTED ON A PLURALITY OF CLIENT DEVICES

(75) Inventors: Michael Dowling, Santa Monica, CA (US); David E. Klein, Sherman Oaks, CA (US); Farzana Noorzay, Reseda, CA (US); Edric S. Rominger, Atlanta, GA (US); Ahmed A. Siddique, Suwnee, GA (US)

(73) Assignee: Interpret, LLC, Santa Monica, CA (US)

( * ) Notice: Subject to any disclaimer, the term of this patent is extended or adjusted under 35 U.S.C. 154(b) by 501 days.

(21) Appl. No.: 12/271,657

(22) Filed: Nov. 14, 2008

(65) Prior Publication Data

US 2010/0125657 A1 May 20, 2010

(51) Int. Cl.
*G06F 15/173* (2006.01)
*G06F 11/30* (2006.01)
*G06F 11/34* (2006.01)

(52) U.S. Cl.
CPC ........ *G06F 11/3051* (2013.01); *G06F 11/3495* (2013.01); *G06F 2201/81* (2013.01); *G06F 11/3409* (2013.01)
USPC ......................................... 709/224; 709/203

(58) Field of Classification Search
CPC ............ G06F 11/3051; G06F 11/3495; G06F 2201/81; G06F 11/3409
USPC ................................................. 709/217–228
See application file for complete search history.

(56) References Cited

U.S. PATENT DOCUMENTS

| 6,352,479 | B1 | 3/2002 | Sparks, II |
| 6,772,202 | B2 | 8/2004 | Wright |
| 6,979,267 | B2 | 12/2005 | Leen et al. |
| 7,029,394 | B2 | 4/2006 | Leen et al. |
| 7,266,818 | B2* | 9/2007 | Pike et al. ..................... 717/176 |
| 2006/0143675 | A1 | 6/2006 | Willis et al. |
| 2006/0258416 | A1 | 11/2006 | Crawford |
| 2007/0078706 | A1 | 4/2007 | Datta et al. |
| 2007/0261077 | A1 | 11/2007 | Zalewski et al. |
| 2010/0017506 | A1* | 1/2010 | Fadell ........................... 709/224 |
| 2010/0069148 | A1* | 3/2010 | Cargill ........................... 463/25 |
| 2010/0121744 | A1* | 5/2010 | Belz et al. ....................... 705/30 |

OTHER PUBLICATIONS

GameSpy.com. <http://www.gamespy.com/>. 1996-2008. Access date: Nov. 11, 2008. IGN Entertainment, Inc; Brisbane, California. 3 pages.
GameStats.com. <http://www.gamestats.com/>. 1996-2008. Access date: Nov. 11, 2008. IGN Entertainment, Inc; Brisbane, California. 5 pages.

(Continued)

*Primary Examiner* — Haresh N Patel
(74) *Attorney, Agent, or Firm* — Alleman Hall McCoy Russell & Tuttle LLP

(57) ABSTRACT

A system and method for collecting computer application usage data from a plurality of client devices. The system may include a monitoring program executable on each of the plurality of client devices. The monitoring program may be configured to receive from a server via a computer network monitoring data including one or more application identifiers, and to identify one or more target application programs executed on the client device as matching one of the identifiers. The monitoring program may further be configured to gather usage data for the target application program over a period of time, and send a message back to the server including the usage data. Reports may be generated based on the usage data.

16 Claims, 4 Drawing Sheets

(56) References Cited

OTHER PUBLICATIONS

IGA Worldwide. <http://www.igaworldwide.com/>. 2004-2007. Access date: Nov. 11, 2008. IGA Worldwide, Inc; New York, New York. 2 pages.
Woodcock, Bruce Sterling. "An Analysis of MMOG Subscription Growth." <http://www.mmogchart.com/about/>. 2002-2008. Access date: Nov. 11, 2008. 8 pages.
"Ultra Game Play Game Statistics." <http://www.ultragameplay.com/games-statistics.html>. 2007. Access date: Nov. 11, 2008. 6 pages.
Quantcast.com. <http://www.quantcast.com/>. Quantcast Corporation; San Francisco, California. Access date: Nov. 11, 2008. 1 page.
VGChartz.com. <http://vgchartz.com/swlaunch.php>. 2007-2008. Access date: Nov. 11, 2008. 2 pages.

* cited by examiner

| Game Title | Admin | Gamer | Start Time | End Time | Delta Time | Idle Time | Total Rank |
|---|---|---|---|---|---|---|---|
| Revenge | Sammo | Sammo | 1-3-2008 18:30:52 | 1-3-2008 19:30:52 | 1:00:00 | 00:00:53 | 42 |
| The Quest | GD111 | GD111 | 1-17-2008 12:4:12 | 1-17-2008 12:4:29 | 00:00:16 | 00:00:00 | 40 |
| The Lamp | 123456 | 123456 | 1-10-2008 16:21:43 | 1-17-2008 16:25:45 | 00:04:01 | 00:00:00 | 66 |
| ......... | ...... | ...... | ............ | ............ | ............ | ............ | ...... |
| ......... | ...... | ...... | ............ | ............ | ............ | ............ | ...... |
| ......... | ...... | ...... | ............ | ............ | ............ | ............ | ...... |

REPORT — 24

FIG. 4

SYSTEM FOR COLLECTING COMPUTER APPLICATION USAGE DATA OF TARGETED APPLICATION PROGRAMS EXECUTED ON A PLURALITY OF CLIENT DEVICES

BACKGROUND

The popularity of computer gaming has increased with the rise of the Internet and the development of online games. Many of these games require significant gaming time for gamers to complete, and a new genre of massively multi-player online games has emerged, which do not have a defined ending but rather are played in so-called persistent worlds that continue indefinitely. As a result, gamers are spending increasing amounts of time engaged in the pursuit of computer gaming. To reach this audience of gamers, in-game advertising technologies have been developed that present in-game advertisements to gamers during game play.

One drawback with current computer games and in-game advertising technologies is that it is difficult to determine usage statistics for various games played by gamers, which could aid in effectively targeting advertising as well as providing feedback to game developers. While the operator of a particular online game may collect access statistics at its own game servers, no mechanism exists for the assemblage of usage data from a wide variety of different games from different game operators and developers, which are played on different user computers and game servers. This can result in ineffective advertising, or misplaced development efforts, both of which can degrade the user experience in a computer game.

SUMMARY

A system and method for collecting computer application usage data from a plurality of client devices are provided. The system may include a monitoring program executable on each of the plurality of client devices. The monitoring program may be configured to receive from a server via a computer network monitoring data including one or more application identifiers, and to identify one or more target application programs executed on the client device as matching one of the identifiers. The monitoring program may further be configured to gather usage data for the target application program over a period of time, and send a message back to the server including the usage data. Reports may be generated based on the usage data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 illustrates an example report that may be generated by the system of FIG. 1.

DETAILED DESCRIPTION

Figure 1:
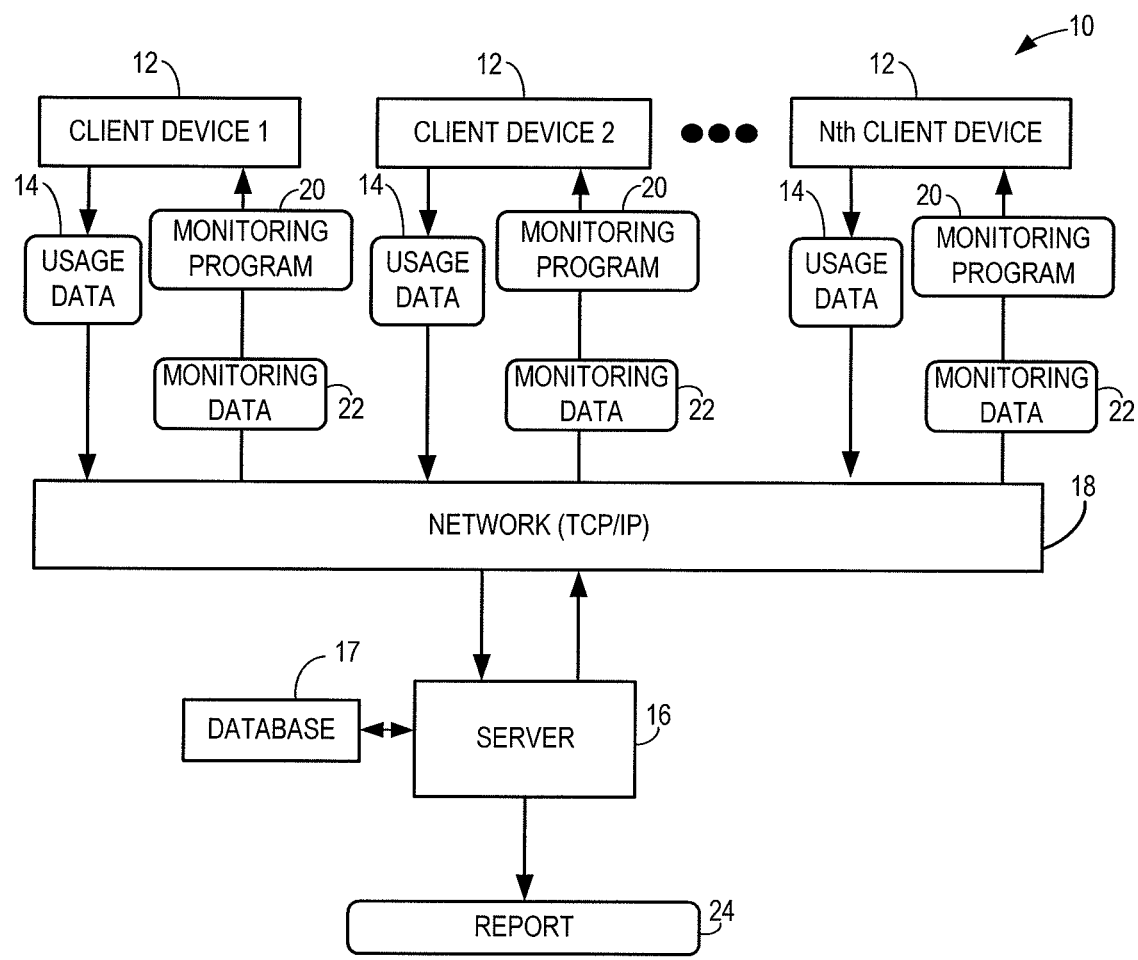
FIG. 1 shows a schematic representation of an embodiment of a data collection system including a server and a plurality of client devices.

FIG. 1 illustrates an embodiment of a data collection system 10 for use in collecting computer application usage data. System 10 includes a plurality of client devices 12 configured to communicate with a server 16 via a computer network 18, such as the Internet, using suitable protocols such as Transmission Control Protocol and Internet Protocol (TCP/IP). Server 16 may be configured to transmit a monitoring program 20 and monitoring data 22 to each of the client devices 12, via network 18.

The monitoring program 20 may be configured to be executed on each client device 12, for example, from the time of download or thereafter upon start-up of the client device, while a user of the computing device interacts with various other computer applications on the client device. The data cannot instruct the program 20, the program 20 is designed to look through the data 22, and monitor all programs listed in this data set (22). The monitoring data 22 may instruct the monitoring program 20 to monitor for computer application usage of one or more target computer programs on the client device 12, as described in detail below. In some embodiments, the target application programs may be computer games.

A login procedure may be initiated in response to execution of the monitoring program 20. The login procedure may include prompting the client for login information such as a username and password. If the login fails the use of the monitoring program may be terminated. However, if the login is successful, execution of the monitoring program continues. In some configurations, login information may be saved, allowing subsequent logins to occur automatically. During periods of offline use, the monitoring program 20 may collect usage data for each user login as described below, and upload the usage data to the server when a network connection is established.

After performing the requested monitoring, the monitoring program 20 may be configured to send usage data 14 reporting the usage of the target application programs on the client device, back to the server 16 via the network 18. The server 16 may be configured to receive and store the usage data from the plurality of clients 12 in a related database 17. The server 16 may further be configured to generate a report 24 based on the usage data 14 that has been received from the plurality of client devices 12.

Figure 2:
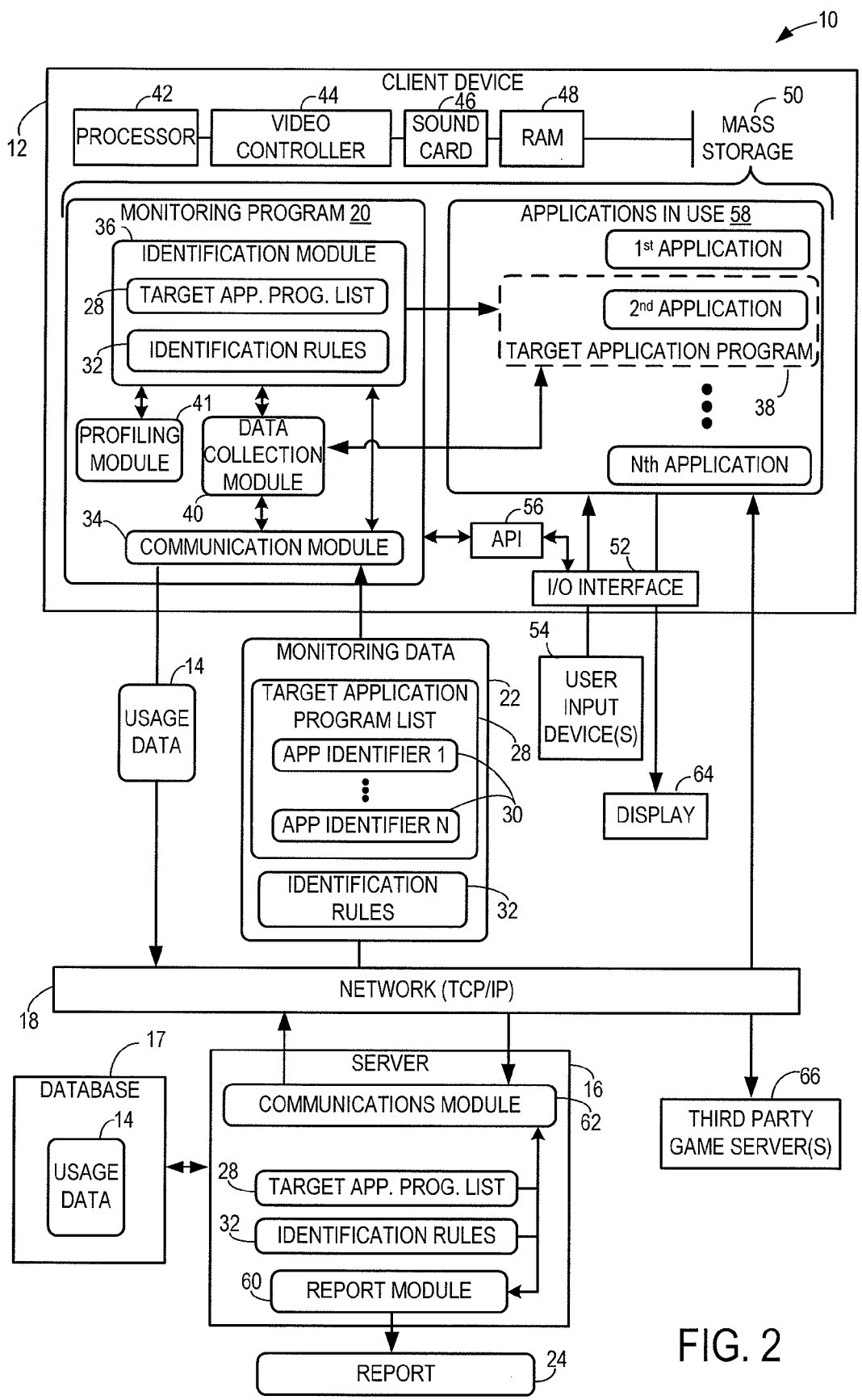
FIG. 2 illustrates a detailed schematic representation of an interaction between a representative client device and the server of the system of FIG. 1.

FIG. 2 illustrates the detailed interaction between server 16 and a representative client device 12 of the system 10 of FIG. 1. It will be appreciated that while only a single client is shown in FIG. 2, the server 16 may communicate in a manner similar to that described below with each of the plurality of the client devices 12 shown in FIG. 1, and such communication may be engaged in concurrently or asynchronously.

Turning initially to the hardware configuration of client device 12, the client device 12 may be configured with a processor 42 linked by a bus to a video controller 44, sound card 46, memory such as random access memory 48, and a mass storage device. An input/output interface 52 may be provided, via which one or more user input devices 54 (e.g., keyboard, mouse, game controller) and a display 64 may be connected to the client device 12. Various application programs may be stored in mass storage device 50 for execution by processor 42 using portions of memory, including the monitoring program 20 and one or more in-use applications 58. An application programming interface (API) 56 may be provided to enable the monitoring programs and other application programs executed on the client device 12 to communicate with the operating system of client device 12, and ascertain various information about the hardware and software configuration of the client device 12.

Turning now to the communication between the server 16 and the client device 12, a server-side communication module 62 of the server 16 may be configured to receive a request for monitoring data 22 from the monitoring program 20, and in response send the monitoring data 22 to the client device 12 via the computer network 18. The monitoring data 22 may include a target application program list 28 including one or more application identifiers 30, which have been generated by and/or stored on server 16. The monitoring data may also include predetermined identification rules 32, which also have been generated by and/or stored on server 16. After an initial monitoring data 22 is sent, it will be appreciated that the predetermined identification rules 32 and/or the target application program list 28 may be updated periodically, either at regular or varying intervals, via the server, through the issuance of subsequent monitoring data 22 over time. The monitoring program 20 and server 16 may be configured to determine whether updated monitoring data 22 is to be downloaded to the monitoring program 20, for example, by tracking the version of the monitoring data 22, for example, and deciding to transmit the monitoring data 22 only if the monitoring program 20 and/or server 16 determine that the monitoring data 22 saved on the client device is out of date.

The monitoring program 20 may include a client-side communication module 34 configured to request the monitoring data from the server, and to receive the monitoring data 22 sent in response, and pass the monitoring data 22 along to other modules within the monitoring program 20. For example, the monitoring program may further include an identification module 36 configured to receive the monitoring data 22, and identify one or more target application programs 38 executed on the client device 12 as matching one of the identifiers 30 and/or one of the predetermined identification rules 32.

The identification module 36 of the monitoring program 20 is configured to identify one or more target computer application programs 38 from among in-use applications 58 for monitoring in at least two ways. First, the monitoring program may query via API 56 to determine in-use applications 58 that are currently being executed on the client device 12, and may compare these applications 58 against a target application program list 28, to identify one or more target application programs that match application identifiers 30 in the target application program list 28. The target application program may, for example, be a computer game that is configured to be executed on the client device 12, and which may also connect to an online third party game server 66 via computer network 18, for example.

In addition, the identification module 36 of the monitoring program 20 may be configured to apply identification rules 32 to determine whether any of the applications 58 that are currently executed on the client device and which do not match any application identifiers 30 in the target list (and thus may be referred to as "unknown" applications), match the predetermined identification rules 32. Such a matching unknown application may be inferred to be a target application program such as a computer game, for example. In this manner, the monitoring program can be used to monitor even usage of application programs that are not included in the target application program list 28, giving a more complete picture of aggregate gaming behavior.

The monitoring program may further include a data collection module 40 configured to gather usage data 14 for the one or more target application programs over a period of time. Once an application 58 is identified as a target application program 38, the data collection module 40 is configured to begin collecting usage data 14 related to the target application program. The usage data may include application title, duration of use, start time of use, end time of use, idle time during which the application was executed but no user activity was detected, and a usage ranking, etc. Where the target application program is a computer game, the usage data may further include gaming application usage data such as player name, rank, score, game achievements, advertisements, spending habbits, peripheral software and hardware usage etc.

Once the usage data 14 is gathered by the data collection module, the client-side communication module 34 of the monitoring program may be further configured to send a message back to the server side communication module 62 of the server 16, including the usage data 14. In some examples, usage data may be transmitted to the server in response to start up of the monitoring program, and at regular or programmatically varied intervals. The usage data may be stored in a database 17 accessible to the server 16, and aggregated with usage data from other client devices 12. A report module 60 executed on the server may generate a report 24 from the usage data received and aggregated from the plurality of clients. An exemplary report 24 is shown in FIG. 4, illustrating computer game usage. The depicted report includes the following data for each targeted application: game title, administrator, gamer, start time, end time, change in time, idle time, as well as total rank. It will be appreciated that the illustrated report is exemplary in nature, and that a wide variety of other usage data may be presented in report 24.

Turning now to the content of the predetermined identification rules 32, the predetermined identification rules 32 may be based on a variety of factors relating to hardware or software executed on the client device 12. For example, the predetermined identification rules 32 may instruct the monitoring program 20 to monitor a hardware configuration of the client device 12. The hardware configuration may be monitored by monitoring hardware parameters such as processor attributes (e.g., processor name and speed) and processor usage, video controller attributes (e.g., video controller name, model number, and adapter RAM size) and video controller usage, memory attributes (e.g., graphics adapter RAM, cache RAM, and main RAM size) and memory usage, sound card attributes and sound card usage, network connection attributes and network connection usage, user input device attributes (e.g., type and number of input devices) and user input device usage, and display attributes (e.g., monitor screen height, and monitor screen width ) and display usage.

The predetermined identification rules 32 may also instruct the monitoring program 20 to monitor a software configuration of the client device 12. The software configuration may be monitored by monitoring software parameters such as operating system attributes and/or network communications attributes. The operating system attributes may include operating system name, build number, major service pack version and/or minor service pack version, for example. The network communications attributes may include the presence and bandwidth of a network connection, and/or a network communications history of uniform resource locators or domains browsed by target application programs on the client device, for example.

In one embodiment, monitoring of the hardware and software configuration of the client device may be implemented via a software and hardware profiling module 41. The software and hardware profiling module 41 may be executed at initial execution of the monitoring program and login, and upon subsequently detecting an upgrade in software or hardware configurations, or at other suitable times. In another embodiment, the software and hardware configuration of the client device may be stored on the client device and/or sent to the server for inclusion in statistical reports. In addition to the configuration of software and hardware, the usage of the software and hardware of the client device may also be monitored and may be used to determine whether unknown application programs are, for example, computer games. Typically, this usage data, used in target application program detection, is not transmitted to the server to conserve bandwidth and memory resources. However, in other embodiments this usage data could be transmitted to the server. Other usage data, such as data indicating usage of a target application program, is typically transmitted to the server, as described herein.

By way of illustration, one example hardware configuration of a client device follows.

Processor Name: Intel(R) Celeron(R) M processor
Processor Speed: 1.70 GHz
Video Controller Name: ATI RADEON XPRESS 200M Series
Video Controller Processor ID: ATI RADEON XPRESS 200M Series (0x5A62)
Video Controller Adapter RAM: 67,108,864
Monitor Screen Height: 800
Monitor Screen Width: 1,280

An example software configuration of a client device follows.

OS Name: Microsoft Windows XP Home Edition
OS Build Number: 2600
Major Service Pack: 2
Minor Service Pack: 0

It will be appreciated that numerous other hardware parameters and software parameters may be monitored by the monitoring program 20, and the above parameters are merely illustrative.

In another embodiment, the predetermined identification rules 32 may further include threshold values against which the software attributes in the software configuration and hardware attributes in the hardware configuration of the client device 12 are compared, and actions to take if the thresholds values are met. For example, an unknown application program might be determined to be a computer game application program if the video controller usage and/or sound card usage are above a threshold value when executing the computer game application program.

The monitoring program 20 may be configured to implement such predetermined identification rules 32 by monitoring hardware components such as a processor 42, video controller 44, sound card 46, random access memory (RAM) 48, a mass storage device 50, input/output interface 52 configured to interface with one or more user input devices 54 and a display 64, and/or a network interface through which internet communications are sent, etc. These hardware components may be monitored by the monitoring program by making appropriate calls to the API 56 of the operating system of the client device 12, or by other suitable mechanisms. Similarly, API calls may be used by the monitoring program 20 to query various software attributes of the client device when applying the predetermined identification rules 32. In other examples, the hardware components may not be monitored to decrease the processor usage and storage requirements of the monitoring program.

Although server 16 is depicted as a single server in FIG. 2, it will be appreciated that the server may be embodied by a plurality of servers in a server farm. Further, the functions of server 16 may be distributed across a plurality of computing devices. Thus, the functions related to generating target application program list 28 and identification rules 32 and communicating these in the monitoring data 22 to the client device may be carried out by a server side communication module 62 executed on a first computing device, and the report generation tasks of the report module 60 may be carried out on a second computing device. Typically, the server does not also execute a computer gaming server, such as third party game server 66, although in some embodiments this may be possible.

Figure 3:
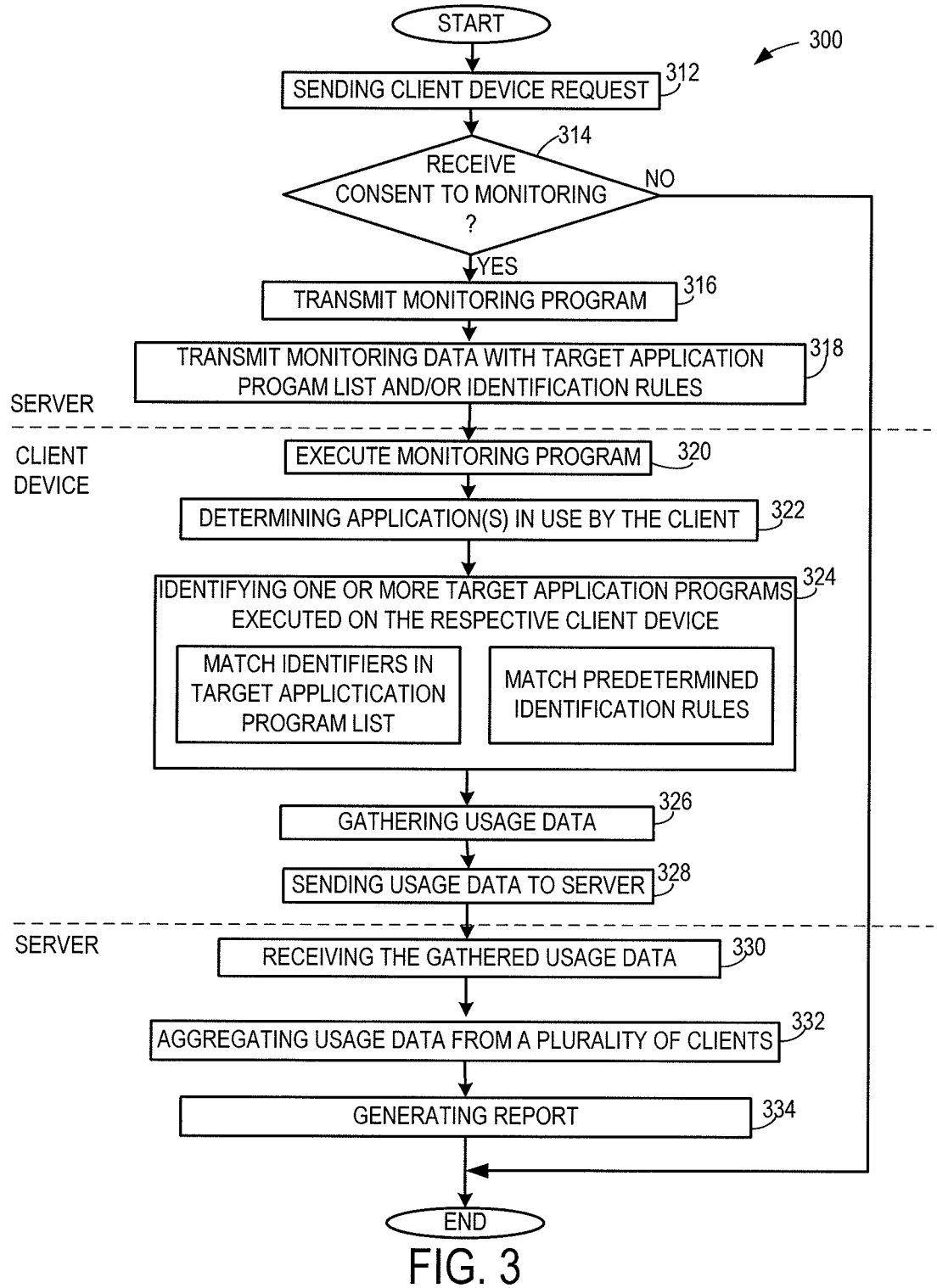
FIG. 3 illustrates a method that may be used to gather consumer usage data from a plurality of client devices.

FIG. 3 shows a method 300 for collecting usage data from a plurality of client devices coupled to a server via a network. Method 300 may be implemented using the hardware and software components of the systems and devices described above, or alternatively may be implemented using other suitable hardware and software components. Typically, steps 312-318 and 330-334 described below are implemented on a server, and steps 320-328 described below are implemented at each of a plurality of client devices.

As illustrated at 312, the method includes sending a request from a server to each of a plurality of client devices over a network. The request may prompt the user of each client device to consent to monitoring of computer application usage on the client device, and transmission of usage data to server 16.

At 314, the method may further include determining if each client has consented to monitoring. If a user of a client device has not consented, the method ends and monitoring is not performed for that client device. However, assuming consent is received for each of the plurality of client devices, then at 316, the method includes transmitting (or downloading) a monitoring program from a server to each of the plurality of client devices, via a computer network.

At 318, the method further includes sending monitoring data from the server to each of the plurality of client devices via a computer network, the monitoring data including one or more application identifiers and/or predetermined identification rules, as described above. The monitoring program of each client device is configured to interpret the monitoring data to identify one or more target application programs executed on the respective client device as matching one of the identifiers and/or one of the predetermined identification rules, and to gather usage data for the one or more target application programs over a period of time.

In some embodiments, the method may be applied to identify target application programs that are computer games. In addition, it will be appreciated that the application identifiers may be included in a target application program list sent from the server to the client devices in monitoring data, for example, as described above.

As described above, the predetermined identification rules may instruct the monitoring program to monitor a hardware configuration and/or a software configuration of the client device. For example, the hardware configuration may be monitored by monitoring hardware parameters such as processor attributes and processor usage, video controller attributes and video controller usage, memory attributes and memory usage, sound card attributes and sound card usage, network connection attributes and usage, user input device attributes and usage, and display attributes and display usage. The software configuration may be monitored by monitoring operating system attributes and/or network communications attributes, as described above.

As shown at 320, the method may include executing the monitoring program, for example, at the time of initial download of the monitoring program to the client device or in response to a start up of the client device.

At 322, the method includes determining the applications in use (i.e. executed) by the client device. If no applications are in use the method may loop to continue determining at 322, until monitoring program is exited, for example when the client device is shut down. If one or more applications are determined to be in use then the method includes, at 324, identifying one or more target application programs executed on the respective client device from among the in-use applications, as matching one of the identifiers and/or one of the predetermined identification rules.

At 326, the method includes gathering usage data for the one or more target application programs over a period of time, which may be specified by the monitoring data received from the server. The usage data may include the types of usage data described above.

At 328, the method may include sending the gathered usage data to the server, from each of the plurality of clients. At 330, the method may include receiving the gathered usage data at the server from each of the plurality of clients. At 332, the method may include aggregating usage data received from each of the plurality of clients, and at 334, the method may include generating an analysis report based on the gathered and aggregated usage data received from each of the plurality of clients.

The above described systems and methods may be used to efficiently gather usage data reflecting usage of different application programs, such as computer games, on a plurality of client devices connected to a server via a computer network, through the use of a downloaded monitoring program, and monitoring data that includes a target application program list and/or identification rules from which the application programs may be identified for monitoring. The method may be utilized even where the different application programs are offered by different manufacturers, utilize different third party game servers, or even in some cases where the identity of the application programs is not known before hand. In this manner rich information about gaming behavior may be gained, which may inform both game development and in-game advertising efforts.

It will be understood that various types of computing devices may be used for the client devices and servers described herein, such as personal computers, laptop computers, mainframe computers, web enabled mobile communications devices, mobile telephones, etc. These computing devices may be connected by a variety of interconnected networks including local area and wide area networks. Each computing device may include a processor, non-volatile and volatile memory, mass storage, a display, and one or more user input devices. The various programs described herein are typically stored in mass storage, and executed by the processor using portions of volatile and non-volatile memory of each computing device. It will be understood that the term program refers broadly to one or more executable files, libraries, stored data, application programming interfaces, and/or other software components that may interact together to perform the functions described herein.

It will be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A data collection system comprising:
a monitoring program executed on each of a plurality of client devices, the monitoring program receiving from a server via a computer network monitoring data including one or more application identifiers, identifying one or more target application programs from a plurality of application programs executed on the client device as matching one of the identifiers, gathering usage data for the target application program over a period of time, and sending a message back to the server including the usage data;
wherein the one or more identifiers are received by the monitoring program in a target application program list from the server, the monitoring program including an identification module identifying the one or more target application programs executed on the client device as matching one of the identifiers in the target application program list and identifying the one or more target application programs executed on the client device as a computer game based on one or more predetermined identification rules, the predetermined identification rules instructing the monitoring program to monitor a hardware configuration of the client device or a software configuration of the client device.

2. The data collection system of claim 1, wherein the monitoring program includes a communication module requesting the monitoring data from the server, receiving the monitoring data from the server in response to the request, and sending the message back to the server including the usage data.

3. The data collection system of claim 1, wherein the monitoring program includes a data collection module gathering the usage data.

4. The data collection system of claim 1, wherein the software configuration is monitored by monitoring operating system attributes and/or network communications attributes.

5. The data collection system of claim 4, wherein the operating system attributes include operating system name, build number, major service pack version and/or minor service pack version.

6. The data collection system of claim 4, wherein the network communications attributes include the presence and bandwidth of a network connection, and/or a network communications history of uniform resource locators or domains browsed by target application programs on the client device.

7. The data collection system of claim 1, wherein the predetermined identification rules and/or the target application program list are updated periodically by the server, the periodic updates being initiated by the monitoring program executed on the client device.

8. A data collection system comprising:
a server device storing one or more predetermined identification rules and/or a target application program list including one or more application identifiers; and
a monitoring program downloaded from the server device and executed on each of a plurality of client devices, the monitoring program including:
a communication module receiving monitoring data including the one or more application identifiers and/or predetermined identification rules from the server device via a computer network;
an identification module identifying one or more target application programs from a plurality of application programs executed on the client device as matching one of the application identifiers and one of the predetermined identification rules, the predetermined identification rules instructing the monitoring program to monitor a hardware configuration of the client device or a software configuration of the client device; and a data collection module configured to gathering usage data for the one or more target application programs over a period of time, wherein the communication module sends a message back to the server device including the usage data.

9. The data collection system of claim 8, wherein the target application programs are computer games.

10. A method for gathering data from a plurality of client devices that communicate with a server device via a computer network, the method comprising:

transmitting a monitoring program from server-device hardware to each of the client devices via the computer network;

sending monitoring data from the server-device hardware to each of the client devices, the monitoring data including one or more application identifiers, each application identifier corresponding to a target application program; and receiving, at the server-device hardware, usage data from each of the client devices, the usage data including, for each client device, data reflecting usage of one or more target application programs executed on that client device over a period of time, wherein the monitoring program of each client device matches the one or more target application programs to the one or more application identifiers sent to that client device and matches the one or more target application programs based on one or more predetermined identification rules, the predetermined identification rules instructing the monitoring program to monitor a hardware configuration of the client device or a software configuration of the client device, and wherein the monitoring program of each client device gathers the usage data of the one or more target application programs on that client device.

11. The method of claim 10, further comprising, at each of the plurality of client devices:

executing the monitoring program; and sending the data reflecting usage of the one or more target application programs executed on that client device over the period of time to the server-device hardware.

12. The method of claim 10, wherein the target application programs are computer games.

13. The method of claim 10, further comprising generating a report based on the usage data.

14. The method of claim 10, wherein the one or more application identifiers include a target application list.

15. The method of claim 10, wherein monitoring the hardware configuration comprises monitoring one or more of a processor attribute, a video-controller attribute, a memory attribute, a sound-card attribute, a network-connection attribute, a user-input device attribute, a display attribute, an operating-system attribute, and a network-communications attribute.

16. The method of claim 10 wherein the usage data is gathered at periodic intervals and/or each time client-server communication is made.

* * * * *